RE 25284

Nov. 17, 1959 B. D. LOUGHLIN 2,913,522

AUTOMATIC-CONTROL SYSTEMS FOR TELEVISION RECEIVERS

Filed Aug. 4, 1954 3 Sheets-Sheet 1

AUTOMATIC-CONTROL SYSTEMS FOR TELEVISION RECEIVERS

Filed Aug. 4, 1954 3 Sheets-Sheet 2

Nov. 17, 1959 B. D. LOUGHLIN 2,913,522

AUTOMATIC-CONTROL SYSTEMS FOR TELEVISION RECEIVERS

Filed Aug. 4, 1954 3 Sheets-Sheet 3

United States Patent Office 2,913,522

Patented Nov. 17, 1959

2,913,522

AUTOMATIC-CONTROL SYSTEMS FOR TELEVISION RECEIVERS

Bernard D. Loughlin, Lynbrook, N.Y., assignor to Hazeltine Research, Inc., Chicago, Ill., a corporation of Illinois Application August 4, 1954, Serial No. 447,763

4 Claims. (Cl. 178—7.3)

GENERAL

The present invention is directed to automatic-control systems for television receivers for controlling one or more of the operations thereof. The invention is especially directed to direct-current restorer systems for television receivers for restoring or recreating the direct-current component representative of the average brightness level of a television signal which is lost by the translation of that signal through an alternating-current coupling in the receiver. An automatic-control system in accordance with the invention also has utility in the derivation of an automatic-gain-control potential for a television receiver.

In accordance with present-day television practice, a transmitted television signal comprises a carrier-wave signal which is modulated during trace intervals by video-frequency and steady or direct-current components representative respectively of light variations in an image being transmitted and also its average background illumination. During the intervening retrace intervals, the carrier signal includes blanking or pedestal portions having a predetermined amplitude level corresponding to a given shade, which is usually near black. The carrier signal is modulated during a portion of this retrace interval by synchronizing-signal components which correspond to the initiations of successive lines and fields in the scanning of an image.

At the receiver, an electron beam of a cathode-ray image-reproducing device or tube is so deflected as to scan a target or screen in a series of fields of parallel lines. The synchronizing-signal components of the received composite television signal are separated from the other modulation-signal components and are utilized to control the scanning apparatus of the receiver so as to synchronize its operation with that of similar apparatus employed at the transmitter in developing the signal. The intensity of the electron beam is controlled by the video-frequency modulation components, thereby to reconstruct the image.

The video-frequency modulation components which are derived by the modulation-signal detector of a television receiver are usually translated by a video-frequency amplifier of one or more stages to the brilliancy-control input circuit of the cathode-ray image-reproducing tube. Direct-current amplifiers are rather expensive and present stability problems. Accordingly, they are not ordinarily employed throughout the video-frequency amplifier channel of a television receiver. Consequently, it is customary to employ in that channel one or more stages of alternating-current amplification together with a direct-current restorer system for recreating the direct-current component lost because of the alternating-current coupling or couplings.

The composite television signal translated by a television receiver is subject to large amplitude random noise pulses which upset the operation of those employing an efficient direct-current restorer system, which is a peak detector device, causing the latter to stabilize on the tips of the noise pulses rather than on the tips of the lower amplitude synchronizing pulses. As a result, when noise is present during the retrace intervals, an image produced by such a monochrome television receiver has poor contrast and the image is often referred to as being "milky." To reduce this undesirable effect, the direct-current restorer systems of many television receivers have been designed in a manner to make the systems less efficient as peak detectors. Such direct-current restorer systems then afford a somewhat better performance with respect to noise but at the expense of poorer direct-current restoration. Some manufacturers have considered the over-all performance of the last-mentioned type of direct-current restorer systems as being not sufficiently satisfactory as to warrant the added cost of the components of the restorer. Consequently, direct-current restorer systems are frequently omitted from many monochrome television receivers.

In tricolor television receivers, such as those employing three electron guns in the image-reproducing apparatus thereof, accurate direct-current restoration is desirable to maintain good color balance in the reproduced image. Prior such receivers ordinarily employ a peak detector in each of the three color channels for direct-current restoration and are susceptible to noise for reasons mentioned above. This restoration problem is more critical in a color-television receiver than in a monochrome receiver and, unless accurate restoration is effected in each of the three color channels thereof, undesirable errors in both reproduced chromaticity and brightness will result.

Another important function which is preferably performed in the signal-translating channel of a television receiver is the maintenance of the intensity of the output signal thereof within a relatively narrow range for a wide range of received signal intensities. This function is ordinarily referred to as automatic gain control. The amplitude level of the peaks of the synchronizing-signal pulses of a television carrier wave is a measure of the carrier-wave intensity independent of the light-modulation components. Accordingly, in most television receivers, an automatic gain control is derived in a control system which is responsive to the tips of the synchronizing-signal pulses of the applied television signal. As previously mentioned, random noise pulses often extend above the tips of the synchronizing pulses and these large amplitude noise pulses will cause the automatic-gain-control system to derive an erroneous control potential which may impair the quality of the image reproduced by the television receiver.

It is an object of the invention, therefore, to provide a new and improved system for automatically controlling one or more operating characteristics of a television receiver.

It is another object of the invention to provide for use in a monochrome- or in a color-television receiver a new and improved direct-current restorer system which avoids one or more of the above-mentioned disadvantages and limitations of prior restorer systems.

It is a further object of the invention to provide for use in a television receiver a new and improved direct-current restorer system which is substantially immune to random noise pulses occurring during the blanking intervals of the applied composite television signal.

It is a still further object of the invention to provide for use in a television receiver a new and improved automatic-control system for providing both direct-current restoration and an automatic-gain-control potential.

It is an additional object of the present invention to provide for use in a television receiver a new and improved direct-current restorer system which is simple in construction, relatively inexpensive to manufacture, and provides a direct-current component which is accurately representative of the average brightness level of a composite television signal.

For a better understanding of the present invention, together with other and further objects thereof, reference is had to the following description taken in connection with the accompanying drawings, and its scope will be pointed out in the appended claims.

Referring to the drawings:

Fig. 1 is a circuit diagram, partly schematic, of a complete monochrome-television receiver including an automatic-control or direct-current restorer system in accordance with a particular form of the present invention;

Figs. 2*a*–2*c*, inclusive, are graphs utilized in explaining the operation of the control system utilized in the Fig. 1 receiver;

Figure 5:
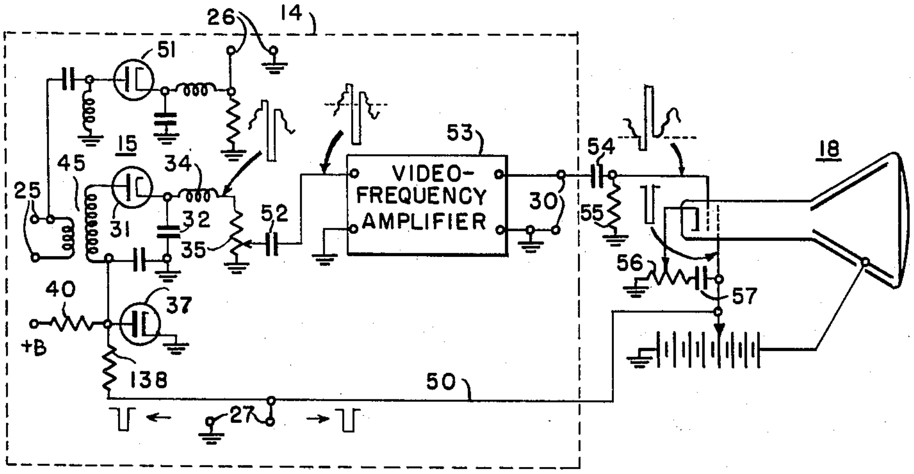
Fig. 5 is a circuit diagram of a further form of a direct-current restorer system in accordance with the invention.
Figure 6A:
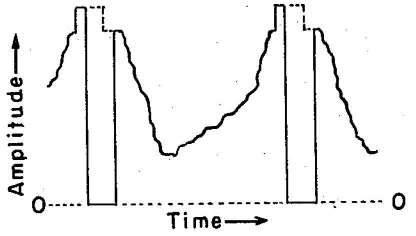
Figure 6B:
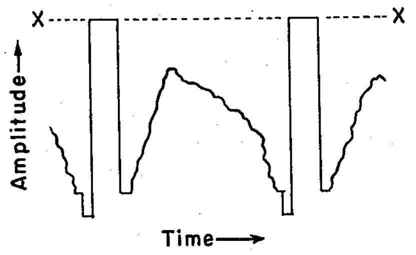
Figure 7:
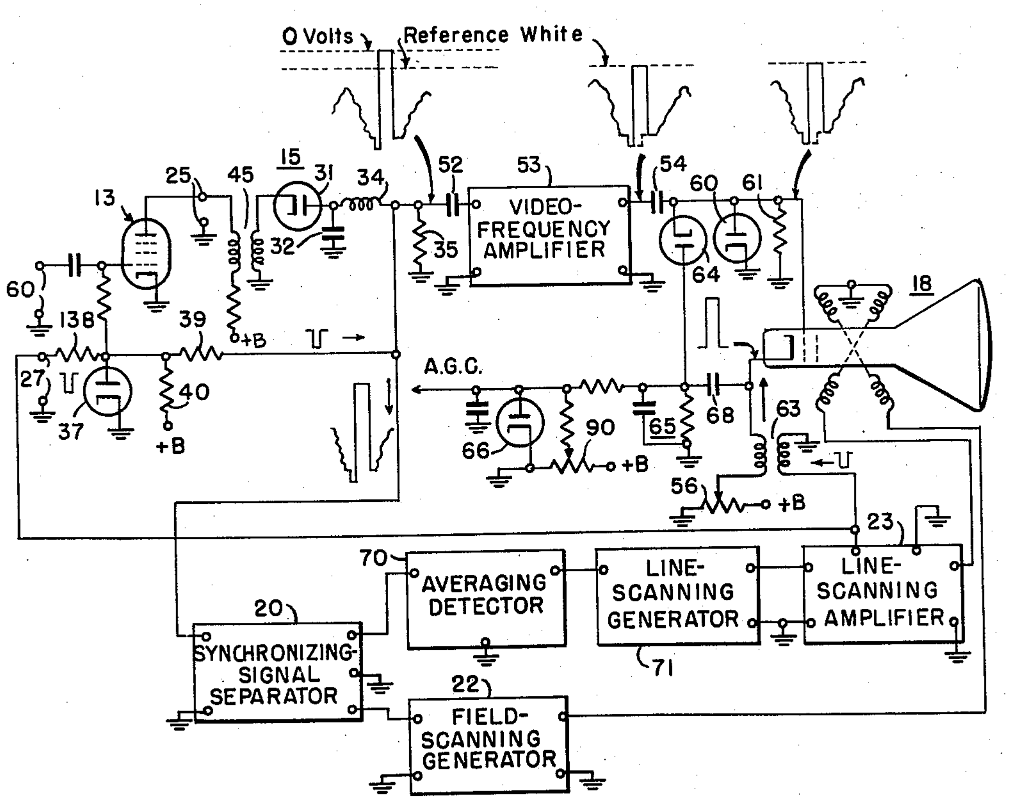

Figs. 6*a* and 6*b* are graphs employed in explaining the operation of the Fig. 5 control system, and Fig. 7 is a circuit diagram, partly schematic, of an additional form of automatic-control system embodying the present invention.

Figures 1, 2A, 2B, 2C:
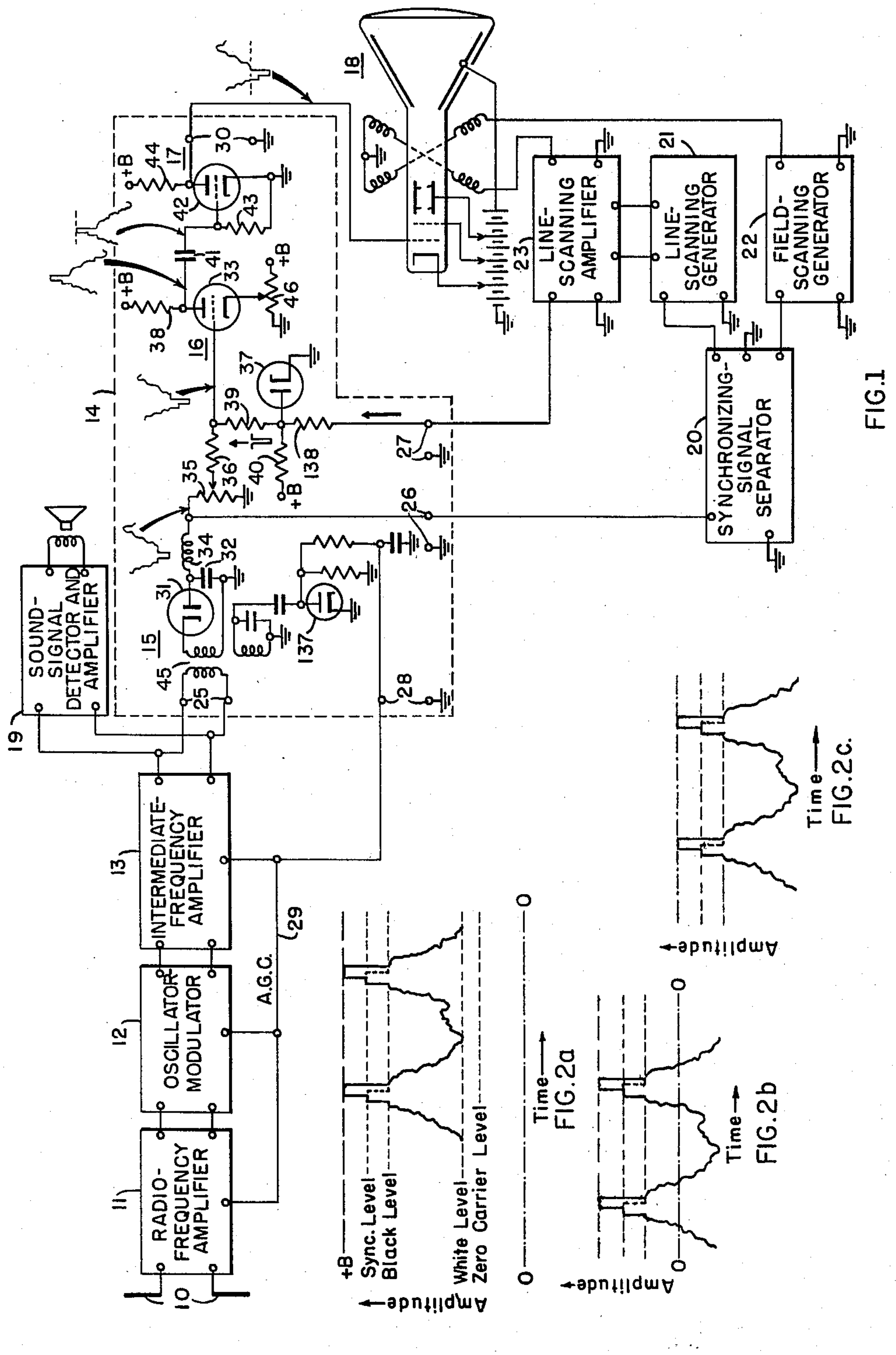

*General description of Fig. 1 receiver*

Referring now more particularly to Fig. 1 of the drawings, the television receiver there represented comprises a receiver of the superheterodyne type including an antenna 10 coupled to a radio-frequency amplifier 11 of one or more stages. There are coupled to the latter unit in cascade, in the order named, an oscillator-modulator 12, an intermediate-frequency amplifier 13 of one or more stages, an automatic-control system 14 having input terminals 25, 25 and including a detector and automatic-gain-control system 15, a direct-current video-frequency amplifier 16, and an alternating-current video-frequency amplifier 17 which operates with a zero bias in its input circuit, and a cathode-ray image-reproducing device 18 of conventional construction connected to the output terminals 30, 30 of unit 14 and provided with the usual line-frequency and field-frequency scanning coils for deflecting the cathode-ray beam in two directions normal to each other. Connected to the output terminals of the intermediate-frequency amplifier 13 is a conventional sound-signal detector and amplifier 19 which comprises the usual frequency detector, amplifier, and sound-reproducing device.

The video-frequency output circuit of the detector 15 is coupled through a pair of terminals 26, 26 and a synchronizing-signal separator 20 to the input circuits of a line-scanning generator 21 and a field-scanning generator 22. The output circuit of the generator 21 is coupled in a conventional manner to the line-scanning coil of the image-reproducing device 18 through a line-scanning amplifier 23 while the field-scanning generator 22, which may include suitable amplifiers, is connected to the field-scanning coil of the device. An output circuit of the line-scanning amplifier 23 is connected to input terminals 27, 27 of the control system 14 for supplying to the video-frequency amplifier 16 during the retrace intervals periodic control pulses for controlling the operation thereof in a manner which will be explained in detail subsequently. Output terminals 28, 28 of the gain-control circuit of the detector of unit 15 are connected to the input circuits of one or more of the stages of units 11, 12, and 13 by a control circuit conductor 29 to supply an automatic-gain-control of AGC effect to those stages. The units 10–23, inclusive, with the exception of the control system 14, portions of which are constructed in accordance with the present invention and will be described hereinafter, may be of conventional construction and operation so that a detailed description and explanation of the operation thereof are unnecessary herein.

*General operation of Fig. 1 receiver*

Considering briefly, however, the general operation of the above-described receiver as a whole, television signals intercepted by the antenna system 10 are selected and amplified in the radio-frequency amplifier 11 and are supplied to the oscillator-modulator 12 wherein they are converted into intermediate-frequency signals. The latter, in turn, are selectively amplified in the intermediate-frequency amplifier 13 and are delivered to the detector 15. The modulation components of the signal are derived by the detector 15 and are applied to the direct-current video-frequency amplifier 16 wherein those components and the original unidirectional component are amplified. These components are then supplied to the alternating-current video-frequency amplifier 17 for further amplification and direct-current restoration, whereupon they are applied to the input circuit of the image-reproducing device 18.

A control voltage, which is derived by an automatic-gain-control supply in the unit 15, is applied by the control circuit conductor 29 as an automatic-amplification-control bias to the gain-control circuits of units 11, 12, and 13 to maintain the signal input to the detector within a relatively narrow range for a wide range of received signal intensities. The unit 20 selects the synchronizing signals from the other modulation components of the composite video-frequency signal applied thereto by the output terminals 26, 26 of the detector 15. The line-synchronizing and the field-synchronizing signals are also separated from each other in unit 20 and are then supplied to individual ones of the generators 21 and 22 to synchronize the operation thereof. An electron beam is produced by the cathode-ray image-reproducing device 18 and the intensity of this beam is controlled in accordance with the video-frequency signal impressed on the brilliancy-control electrode thereof through the output terminals 30, 30 of the video-frequency amplifier 17 and the control voltage applied to the cathode of device 18. Sawtooth current waves are generated in the line-frequency and field-frequency generators 21 and 22, respectively. The output signal of generator 21 is supplied to the line-scanning coil of unit 18 through the amplifier 23 while the output signal of generator 22 is supplied directly to the field-scanning coil of device 18 to produce the usual scanning fields, thereby to deflect the cathode-ray beam of device 18 in two directions normal to each other to trace a rectilinear scanning pattern on the screen of the tube and thereby reconstruct the translated picture.

The audio-frequency modulation components of the received signal are derived in a conventional manner by the sound-signal detector and amplifier 19 and are applied to the loudspeaker thereof and converted to sound.

*Description of direct-current restorer system 14 of Fig. 1*

Referring now more particularly to the direct-current restorer system 14 of Fig. 1, the system there represented comprises a first signal-translating circuit responsive to a composite television signal including an average brightness component and blanking and synchronizing portions which are undesirably subject to random noise pulses. This circuit comprises the control electrode-cathode input circuit of the direct-current video-frequency amplifier 16 and may also be considered to include the preceding stages wherein the direct-current component of the composite signal exits, for example, the radio-frequency amplifier 11, the oscillator-modulator 12, the intermediate-frequency amplifier 13, the modulation-signal detector 15, and the video-frequency amplifier 16. The detector 15 includes a conventional modulation-signal detector unit comprising a diode 31 which is transformer coupled to the input terminals 25, 25, the cathode of the diode being connected to ground through one winding of transformer 45 and the anode being coupled to ground through a radio-frequency by-pass condenser 32. The anode of the diode 31 is conductively connected to the control electrode of a repeater tube 33 of the video-frequency amplifier 16 through a choke coil 34, a voltage divider 35 which serves as a contrast control, and a resistor 36. The automatic-gain-control supply of the detector 15 may comprise a conventional AGC rectifier system which, for simplicity, is represented as a diode rectifier 137 inductively coupled in a conventional manner between the input terminals 25, 25 and the output terminals 28, 28 for supplying gain-control potential to units 11–13, inclusive. The anode of tube 33 of the video-frequency amplifier 16 is connected through an anode load resistor 38 to a source of potential indicated as +B which supplies a potential of a predetermined value. The cathode of the tube 33 is connected to a voltage divider 46 which serves as a brightness control and has one terminal connected to a source +B and the other terminal thereof connected to ground.

The direct-current restorer system 14 also includes a supply circuit, coupled to the aforesaid first circuit or input circuit of the video-frequency amplified 16, for introducing periodic pulses of negative polarity therein during the intervals of the blanking and synchronizing portions of the detected composite television signal to develop in the output circuit of tube 33, with the composite signal also appearing thereat, a resultant signal having the aforesaid average brightness component and having portions extending during those intervals to a predetermined reference level, namely to the level of the source +B connected to the anode of tube 33, which level is unaffected by the random noise pulses. This supply circuit comprises the terminals 27, 27 and connections to the control electrode of tube 33 and may also be considered to include the output circuit of the line-scanning amplifier 23 and a polarity-reversing device therein, such as a transformer, for developing relatively large amplitude negative polarity pulses during the retrace intervals of the line-scanning system. This supply circuit preferably includes a wave-shaping system comprising a diode limiter 37 having its cathode grounded and its anode connected to the junction of resistors 138 and 39 which are serially connected between the ungrounded one of the terminals 27, 27 and the control electrode of tube 33. The anode of the diode 37 is connected to a source of potential +B through a load resistor 40.

The direct-current restorer system 14 further includes a second circuit responsive to the resultant signal developed in the anode circuit of tube 33 as a result of the signal applied to the control electrode of tube 33 by way of the diode 31 of the detector 15 and the input terminals 27, 27. The aforesaid second circuit includes a coupling in the form of a condenser 41 that is ineffective to translate the average brightness component of the signal appearing on the control electrode of tube 33 and further includes stabilizing means responsive to the resultant signal for stabilizing it at the reference level comprising that of the source +B connected to the anode of tube 33, whereby the average brightness component is restored in the stabilized signal and is substantially unaffected by the random noise pulses. This second circuit comprises the alternating-current video-frequency amplifier 17 with its coupling condenser 41 and its electron tube 42 that is arranged to operate at zero bias. To this end, the cathode of the tube 42 is connected to ground and a grid-leak resistor 43 interconnects the control electrode and the cathode of that tube. The anode of tube 42 is connected through a load resistor 44 to a source of potential +B and is also connected through the ungrounded one of the output terminals 30, 30 to the brilliancy-control electrode of the image-reproducing device 18.

*Operation of direct-current restorer system 14 of Fig. 1*

In considering the operation of the system 14 of Fig. 1, it will be understood that, as is customary in present-day television receivers, the gain-control supply of the detector 15 is effective to keep the signal input to diode 31 within a relatively narrow range for a wide range of received signal intensities. The composite video-frequency signal derived by the tube 31 of detector 15 is applied to the voltage divider 35 with the synchronizing pulses extending in a negative direction as represented by the wave form above the voltage divider. During the blanking and synchronizing portions of the composite signal and particularly during the latter part of the synchronizing pulses and during the so-called "back-porch" region of the pedestals, the line-scanning amplifier 23 develops and applies to the input terminals 27, 27 large amplitude negative polarity pulses. These pulses are applied through the resistor 138 to the diode 37 and the latter is effective to limit the lower amplitude portions of these pulses so that a generally rectangular pulse is applied through the resistor 39 to the control electrode of tube 33. These pulses are combined with the signal applied to the voltage divider 35 by the detector 15 to produce a resultant signal, the wave form of a portion of which is represented above the junction of the resistor 39 and the control electrode of tube 33. Each control pulse from terminals 27, 27 is effectively superimposed on the synchronizing and pedestal portions of the composite modulation signal derived by the diode 31. The large amplitude negative polarity pulse portions of the resultant signal applied to the control electrode of tube 33 are effective to drive the tube to anode-current cutoff during those pulse portions. The tube 33 reverses the polarity of the signal applied to its control electrode in a conventional manner so that the signal appearing at its anode has a wave form similar to that represented near that anode for a small portion of the signal. Fig. 2*a* of the drawings represents more clearly the wave form of a portion of the signal appearing at the anode of tube 33. It will be seen from Fig. 2*a* that the positive-going tips of the resultant signal extend to the level +B which is unaffected by random noise pulses because the tube 33 is cut off at this time. The other portions of the signal extend below this level with the tips of the synchronizing pulses forming a step at a level denoted "sync level." The white region of the image-information portion of the resultant signal extends toward the zero carrier level as represented.

When an output signal of a direct-current amplifier such as the amplifier 16 is translated through an alternating-current coupling such as the condenser 41, information representative of the average brightness level is lost and the translated picture information represents only the fluctuations in the light values with reference to that average brightness level. The average brightness axis corresponds to the alternating-current axis imparted to the translated signal by the condenser 41. This axis is represented by the axis O—O in Fig. 2*b* of the drawings which would correspond to a zero voltage level if the tube 42 were not in circuit. Since the tube 42 of the alternating-current amplifier 17 is operated at zero bias, the positive-going pulse portions of the wave cause control electrode-cathode current to flow in that tube and develop more negative bias on the electrode of condenser 41 which is connected to the control electrode, thereby stabilizing the tips of the large amplitude pulse portions at a level corresponding to approximately zero bias as represented in Fig. 2*c* thus restoring or recreating information representative of the average brightness level of the translated signal. The amplifier 17 reverses the polarity of the applied signal and applies to the terminals 30, 30 an output signal having its pulse portions extending in a negative direction as represented near those terminals in Fig. 1 of the drawings. The positive potential applied to the cathode of the image-reproducing device 18 is of such magnitude that the pedestals or blanking portions of the signal applied to the control electrode occur at the cutoff point of the cathode-ray tube of device 18. Thus, the intensity of the cathode-ray beam is varied between the white level and the black level of the signal applied to its control electrode by the output terminals 30, 30 and faithfully reproduces a monochrome image of the received television signal.

In a television receiver having a conventional direct-current restorer, large amplitude random noise pulses are superimposed on the tips of the synchronizing-signal pulses translated by the receiver and cause the direct-current restorer thereof to stabilize on the tips of those noise pulses. Accordingly, an improper direct-current restoration would take place giving rise to an improper average brightness of the reproduced image. In the restorer system 14 of the present invention, however, stabilization by the direct-current restorer comprising the control electrode-cathode circuit of the video-frequency amplifier 17 always takes place at a predetermined reference level, namely the level +B, which is unaffected by random noise pulses and accurate direct-current restoration action takes place unimpaired by noise, thereby resulting in the production of an image wherein the average brightness level is correctly represented.

Figure 3:
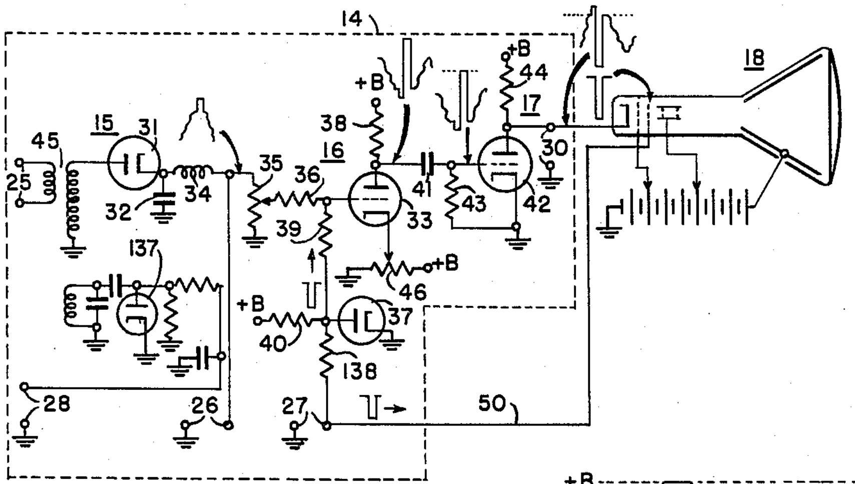
Fig. 3 is a circuit diagram of another form of a direct-current restorer system in accordance with the invention.

*Description of Fig. 3 restorer system and explanation of operation thereof*

Referring now to Fig. 3 of the drawings, there is represented a direct-current restorer system 14 which is generally similar to that shown in Fig. 1. Accordingly, corresponding elements are designated by the same reference numerals. Fig. 3 represents a restorer system wherein the periodic pulses which are introduced into the main signal-translating channel of the receiver during the intervals of the blanking and synchronizing portions of the composite television signal extend into the infrawhite region of the composite signal rather than into the infrablack region as with the Fig. 1 system. The system 14 of Fig. 3 differs from that of Fig. 1 in that the diode 31 of the detector 15 is so poled that the synchronizing pulses of the output signal thereof extend in a positive direction. Large amplitude negative polarity pulses, which may be derived from the line-scanning amplifier 23 as in Fig. 1, are applied to the input terminals 27, 27. The ungrounded one of these terminals is connected by a control circuit conductor 50 to the screen electrode of the image-reproducing device 18. The ungrounded one of the output terminals 30, 30 of unit 14 is connected to the cathode of device 18 and the control electrode of the latter is connected to a suitable positive potential.

Figure 4:
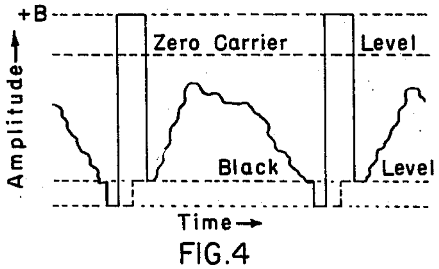
Fig. 4 is a graph utilized in explaining the operation of the Fig. 3 system.

The operation of the restorer system of Fig. 3 is generally similar to that of the Fig. 1 system and, hence, it will be unnecessary to explain it in detail. The composite video-frequency signal derived by the detector 15 with its synchronizing pulses extending in a positive direction and the periodic negative-going pulses supplied by terminals 27, 27 are applied to the control electrode of the tube 33 of the direct-current amplifier 16. There is produced at the anode of tube 33 a resultant signal having the wave form as represented near the anode and also as shown to an enlarged scale in Fig. 4 of the drawings. Since the tube 33 is driven to anode-current cutoff by the negative-going pulses applied to its control electrode from the terminals 27, 27, these pulses after being reversed in polarity have tips extending to the +B level as shown in Fig. 4. The zero carrier levels appear as indicated and the white level is at a somewhat lower level in accordance with standard practice. The pedestals and the tips of the synchronizing signals appear at less positive levels of the resultant signal of Fig. 4. It will be observed that the periodic pulses extend to the infrawhite region rather than into the infrablack region as in the Fig. 1 embodiment of the invention. The alternating-current amplifier 17 operates at zero bias and stabilizes on the tips of the periodic pulses thus restoring the average brightness component in the stabilized signal in a manner which is unaffected by random noise pulses as previously explained. Amplifier 17 reverses the polarity of its applied signal and applies the resultant signal with its synchronizing pulses extending in a positive direction and the periodic pulses extending in a negative direction as represented near the terminals 30, 30. The potential applied to the control electrode of the image-reproducing device 18 is adjusted so that the blanking portions of the stabilized resultant signal applied to the cathode of the device occur at the cutoff level thereof.

To avoid producing white streaks on the face of the image-reproducing device during the intervals of the periodic pulses which extend into the infrawhite region as mentioned above, the large amplitude negative polarity periodic pulses are applied to the screen electrode of device 18 in order to prevent the electron beam from striking the screen of the image-reproducing device during the intervals of the periodic pulses. Thus, unit 18 may be said to comprise a cathode-ray image-reproducing device which is responsive to the stabilized resultant signal applied thereto by the terminals 30, 30 for reproducing an image therefrom and which includes a cathode-ray beam-control circuit, namely the screen-electrode circuit, that is responsive to the periodic pulses from terminals 27, 27 for effectively interrupting the cathode-ray beam during the intervals of the periodic pulses.

*Description of Fig. 5 restorer system and explanation of operation thereof*

In Fig. 5 of the drawings, there is represented a direct-current restorer system which is quite similar to that of Fig. 3. Accordingly, corresponding elements are designated by the same reference numerals. The system of Fig. 5 also inserts periodic pulses which extend into the infrawhite region of the composite video-frequency signal translated through the main channel of the receiver for the purpose of providing a direct-current restoration action which is substantially independent of random noise pulses. The supply circuit including the terminals 27, 27 applies these periodic pulses to the modulation-signal detector 15 for periodically disabling the receiver. To this end, the terminals 27, 27 are connected through the resistor 138 associated with the diode limiter 37 which is connected through a winding of the transformer 45 to the detector diode 31. A diode detector 51 of conventional construction is coupled to the input terminals 25, 25 and has its output circuit coupled to terminals 26, 26 for deriving synchronizing pulses from the intermediate-frequency signal applied to terminals 25, 25. The detector 31 for deriving the video-frequency components is so poled as to develop across the contrast-control voltage divider 35 a signal wherein the synchronizing pulses extend in a positive direction and the periodic pulses extend in a negative direction into the infrawhite region. A signal appearing across the divider 35 is applied to the control electrode of the image-reproducing device 18 through a couplng condenser 52, an alternating-current video-frequency amplifier 53, the terminals 30, 30, and a coupling condenser 54. A resistor 55 is connected between the control electrode of device 18 and ground and the cathode of the latter is connected to ground through an adjustable resistor 56 which serves as a brightness control having one terminal grounded and the other terminal connected through a condenser 57 to the screen electrode of the device 18. The periodic pulses applied to the anode of the diode 31 from the terminals 27, 27 are effective to render it nonconductive during the blanking and synchronizing portions of the intermediate-frequency wave signal applied to the input terminals 25, 25. After detection, the signal appearing across the voltage divider 35 has the wave form represented in Fig. 6a of the drawings. This signal, after translation through condenser 52, video-frequency amplifier 53, and condenser 54, loses its average brightness component. However, the brilliancy-control input circuit of the image-reproducing device 18 is responsive to the alternating-current signal applied thereto by the condenser 54 with the polarity indicated as in Fig. 6*b* and by grid-current rectification stabilizes that signal at a predetermined reference level X—X in the infrawhite region, which level is unaffected by random noise pulses and corresponds to the positive tips of the periodic pulses. Simultaneously with the application of these periodic pulses to the control electrode of device 18, negative polarity control pulses are applied to the screen electrode of device 18 for effectively disabling that device during the intervals of the periodic pulses. This disabling operation prevents those pulse portions, which extend into the infrawhite region and are applied to the control electrode of device 18, from developing white streaks on the face of the cathode-ray tube thereof. The bias on the cathode of the device 18 during the trace portions of the applied signal is established by adjustment of voltage divider 56 which controls the pulse voltage applied to the cathode so that the black level of the signal applied to the control electrode occurs at the cutoff point of the cathode-ray tube.

*Description of automatic-control system of Fig. 7*

Referring now to Fig. 7 of the drawings, there is represented an automatic-control system which is generally similar to that of Fig. 5. Again, corresponding elements and units are designated by the same reference numerals. The control system of Fig. 7 not only is effective to accomplish direct-current restoration but also is capable of developing an automatic-gain-control potential which is relatively unaffected by large amplitude random noise pulses. Furthermore, the system of Fig. 7 is capable of providing an automatic frequency control for the line-scanning system of the television receiver.

In the Fig. 7 system, the periodic pulses supplied by the line scanning amplifier 23 to the input terminals 27, 27 are introduced into the input circuit of the intermediate-frequency amplifier stage 13 (or the radio-frequency amplifier 11, if desired) to develop in the output circuit thereof with the composite signal applied to the input terminals 60, 60 a resultant signal which has the average brightness component and has portions extending during the intervals of the blanking and synchronizing portions of the composite signal to a predetermined reference level which is unaffected by random noise pulses, namely that corresponding to zero input signal. The anode of the limiter 37 is coupled through a resistor 39 to the junction of the coil 34 and the fixed resistor 35 in the output circuit of detector 31 for supplying negative polarity pulses to that junction. The output circuit of the intermediate-frequency amplifier 13 is coupled to the control electrode of the image-reproducing device 18 through the transformer 45, detector 15, condenser 52, alternating-current video-frequency amplifier 53, and condenser 54. The diode 31 of the detector 15 is so poled as to translate the composite video-frequency signal with its synchronizing pulses extending in a negative direction. Instead of performing the direct-current restoration operation in the control electrode-cathode circuit of the image-reproducing device 18 as in the Fig. 5 embodiment, this operation is performed by a diode 60 having its anode coupled to the control electrode of device 18 and its cathode connected to ground. The diode 60 also includes the usual load resistor 61 connected across the diode. An automatic-gain-control diode 64 has its cathode coupled to the anode of the diode 60 and its anode coupled to ground through a time-constant network 65 having a time constant which is long with respect to the periodicity of the synchronizing pulses applied to the cathode of that diode. A conventional so-called delay diode 66 and circuit elements therefor are coupled in parallel with the time-constant network 65 for providing at the output terminal indicated by the arrow a delayed automatic-gain-control potential. This delay bias circuit includes an adjustable resistor 90 in the load circuit of the diode 66 for adjusting the bias on that diode and for providing contrast control. For the purpose of gating the diode 64 into conduction during retrace intervals of the line-scanning amplifier 23, output terminals of the latter are coupled through a transformer 63 and a condenser 68 to the anode of the diode. The cathode of the image-reproducing device 18 is coupled to ground through the output winding of the transformer 63 through a conventional brightness control 56 for the purpose of applying positive polarity gating pulses to the cathode during the intervals of the blanking and synchronizing portions of the stabilized signal and also for the purpose of establishing the cutoff level of device 18 with reference to the pedestals of the stabilized signal applied to its control electrode. The diode 31 of the detector 15 is so poled and the video-frequency amplifier 53 has a suitable number of stages such that the polarity of the signal translated by the video-frequency translating channel of the receiver is as indicated at the various points in that channel.

The output terminals of the synchronizing-signal separator 20 are coupled to an averaging detector 70 which, in turn, has its output circuit coupled to the line-scanning amplifier 23 through a line-scanning generator 71 having a voltage-responsive input circuit which controls the frequency thereof.

*Operation of automatic-control system of Fig. 7*

The negative polarity pulses applied by the line-scanning amplifier 23 through terminals 27, 27 to the control electrode of the intermediate-frequency amplifier 13 are effective to disable that amplifier during intervals of the blanking and synchronizing portions of the intermediate-frequency wave signal applied to terminals 60, 60. The wave-signal output of amplifier 13 includes the average brightness component and the output signal, derived therefrom by the modulation-signal detector 31, has the wave form represented above the resistor 35, assuming that the negative polarity pulse supplied by terminals 27, 27 was not applied to the junction of the coil 34 and the resistor 35. It will be observed that the periodic positive pulse extends into the infrawhite region of the translated signal. The broken horizontal line designated "reference white" is somewhat below the tips of the translated periodic pulses. Negative polarity pulses are also applied to the junction of the coil 34 and the resistor 35 through the resistor 39 connected to the anode of the limiter 37. These pulses are coincident with the periodic pulses but are of lesser amplitude and reduce the effective amplitude of the periodic pulses to the level designated by the reference white level. Consequently, the signal applied through the video-frequency amplifier 53 to the control electrode of the image-reproducing device 18 has the wave form represented above the diode 60. The latter recreates the average brightness level in the well-known manner to the signal supplied to the control electrode of device 18. The positive-going tips of the signal applied to the control electrode of that device are thus stabilized near the reference white level and are not disturbed by random noise pulses. The positive polarity control pulse supplied to the cathode of device 18 during the blanking intervals cuts off the cathode-ray beam thereof during those intervals and prevents white streaks from being formed on the screen of the tube thereof.

The positive polarity pulses just mentioned are also applied to the anode of the diode 64 and the peaks thereof render that tube conductive during the intervals of the periodic pulses in which the latter extend to the reference white level. An automatic-gain-control potential which is a measure of the carrier-wave intensity independent of video modulation components is developed across the network 65 and, after the delay afforded by the delay diode 66 and associated components, is applied by the control circuit conductor denoted AGC to suitable stages of the receiver for use in a well-known manner.

Since the diode 64 is gated on only during the retrace intervals of the television receiver, it is relatively insensitive to large amplitude random noise pulses occurring during the image portions of the television signal translated to the image-reproducing device 18. An automatic-gain-control system of the type described affords another advantage. It will be noted that it is connected to a high-gain point in the video-frequency signal-translating channel of the receiver at a point subsequent to the final alternating-current coupling comprising the condenser 54. Consequently, the gain-control system is effective to take advantage of the gain afforded by all the video-frequency stages, none of which need be a direct-current amplifier, and develops a useful gain-control potential without the need of additional amplifiers in the gain-control system itself.

The line-synchronizing pulses which are applied to the averaging detector 70 have an average width which is determined by the phase of the output signal of the line-scanning system including units 71 and 23. The output voltage of the averaging detector is proportional to this average width and the voltage-responsive input circuit of the line-scanning generator 71 responds to this voltage in a manner to adjust the frequency thereof in the proper direction to maintain a substantially correct line-scanning frequency. Such an automatic-frequency-control system is relatively insensitive to noise pulses occurring between the horizontal synchronizing pulses.

From the foregoing description it will be clear that an automatic-control system in accordance with the Fig. 7 embodiment of the invention is effective to provide both noise-free direct-current restoration and an automatic-gain-control potential. It will also be apparent that a direct-current restorer system in accordance with the various embodiments of the invention is substantially immune to random noise pulses occurring during the blanking intervals of an applied composite television signal.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. An automatic-control system for a television receiver comprising: a first circuit responsive to a composite television signal including an average brightness component and blanking and synchronizing portions which are undesirably subject to random noise pulses; a scanning circuit means, including a scanning generator, having a voltage-responsive input circuit coupled to said first circuit for introducing periodic pulses therein during the intervals of said portions for developing in said first circuit with said composite signal a resultant signal having said average brightness component, having portions extending during said intervals to a predetermined reference level unaffected by said noise pulses and having modified synchronizing portions of durations representative of the relative phase of the output signal of said generator and said first-mentioned synchronizing portions; a second circuit responsive to said resultant signal but including a coupling ineffective to translate said average brightness component and including stabilizing means responsive to said resultant signal for stabilizing the same at said reference level, whereby said average brightness component is restored in said stabilized signal and is substantially unaffected by said noise pulses; a rectifier apparatus means responsive to said synchronizing portions of said stabilized signal and to the peaks of said periodic pulses for deriving a control effect substantially unaffected by said noise pulses; and an averaging detector coupled to said input circuit and responsive to said modified synchronizing portions for deriving therefrom and applying to said input circuit a control voltage to control the relative phase of said output voltage and said first-mentioned synchronizing portions.

2. An automatic-control system for a television receiver comprising: a first circuit responsive to a composite television signal including an average brightness component and blanking and synchronizing portions which are undesirably subject to random noise pulses; a supply circuit means coupled to said first circuit for introducing periodic pulses therein during the intervals of said portions to develop in said first circuit with said composite signal a resultant signal having said average brightness component and having portions extending during said intervals to a predetermined reference level unaffected by said noise pulses; a second circuit responsive to said resultant signal but including a coupling ineffective to translate said average brightness component and including stabilizing means responsive to said resultant signal for stabilizing the same at said reference level, whereby said average brightness component is restored in said stabilized signal and is substantially unaffected by said noise pulses; and a rectifier having one electrode coupled to said stabilizing means and another electrode coupled to said supply circuit means and responsive to said synchronizing portions of said stabilized signal and to the peaks of said periodic pulses for deriving a control effect substantially unaffected by said noise pulses.

3. An automatic-control system for a television receiver comprising: a first circuit responsive to a composite television signal including an average brightness component and blanking and synchronizing portions which are undesirably subject to random noise pulses; a supply circuit means coupled to said first circuit for introducing periodic pulses therein during the intervals of said portions to develop in said first circuit with said composite signal a resultant signal having said average brightness component and having portions extending during said intervals to a predetermined reference level unaffected by said noise pulses; a second circuit responsive to said resultant signal but including a coupling ineffective to translate said average brightness component and including stabilizing means responsive to said resultant signal for stabilizing the same at said reference level, whereby said average brightness component is restored in said stabilized signal and is substantially unaffected by said noise pulses; and a rectifier having one electrode coupled to said stabilizing means and another electrode coupled to said supply circuit means and including a network having a time constant which is long with respect to the periodicity of said synchronizing pulses coupled to said other electrode and responsive to said synchronizing portions of said stabilized signal and to the peaks of said periodic pulses for deriving across said network a control effect substantially unaffected by said noise pulses.

4. An automatic-control system for a television receiver comprising: a first circuit responsive to a composite television signal including an average brightness component and blanking and synchronizing portions which are undesirably subject to random noise pulses; a scanning circuit means, including a scanning generator, having a voltage-responsive input circuit, coupled to said first circuit for introducing periodic pulses therein during the intervals of said portions to develop in said first circuit with said composite signal a resultant signal having said average brightness component, having portions extending during said intervals to a predetermined reference level unaffected by said noise pulses, and having modified synchronizing portions of durations representative of the relative phase of the output signal of said generator and said first-mentioned synchronizing portions; a second circuit responsive to said resultant signal but including a coupling ineffective to translate said average brightness component and including stabilizing means responsive to said resultant signal for stabilizing the same at said reference level, whereby said average brightness component is restored in said stabilized signal and is substantially unaffected by said noise pulses; and an averaging detector coupled to said input circuit and responsive to said modified synchronizing portions for deriving therefrom and applying to said input circuit a control voltage to control the relative phase of said output voltage and said first-mentioned synchronizing portions.

References Cited in the file of this patent

FOREIGN PATENTS 1,050,183 France ---------------- Jan. 5, 1954